United States Patent
Posch

(10) Patent No.: US 10,703,425 B2
(45) Date of Patent: Jul. 7, 2020

(54) AIR-GUIDING DEVICE

(71) Applicant: Dr. Ing. h.c. F. Porsche Aktiengesellschaft, Stuttgart (DE)

(72) Inventor: Tobias Posch, Wimsheim (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 0 days.

(21) Appl. No.: 16/139,143

(22) Filed: Sep. 24, 2018

(65) Prior Publication Data
US 2019/0118873 A1  Apr. 25, 2019

(30) Foreign Application Priority Data
Oct. 19, 2017  (DE) .................. 10 2017 124 442

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
USPC ...................................................... 296/180.5
See application file for complete search history.

(56) References Cited

U.S. PATENT DOCUMENTS

| | | | |
|---|---|---|---|
| 7,770,962 B1* | 8/2010 | Maxwell | B62D 35/007 296/180.5 |
| 9,896,188 B1* | 2/2018 | Joo | B64O 3/48 |
| 2004/0046420 A1 | 3/2004 | Wald et al. | |
| 2005/0029835 A1* | 2/2005 | Adams | B62D 35/007 296/180.1 |
| 2010/0294893 A1* | 11/2010 | Heintze | B64C 3/48 244/219 |
| 2015/0251634 A1 | 9/2015 | Weiler et al. | |
| 2016/0185402 A1 | 6/2016 | Tesch et al. | |
| 2017/0282982 A1* | 10/2017 | Nagasawa | B60R 11/04 |
| 2018/0354567 A1* | 12/2018 | Virdie | B62D 35/007 |
| 2019/0322324 A1* | 10/2019 | Hurst | B62D 35/007 |

FOREIGN PATENT DOCUMENTS

| | | |
|---|---|---|
| DE | 102013214064 A1 | 5/2014 |
| DE | 102013101689 A1 | 8/2014 |
| DE | 102013216610 A1 | 2/2015 |
| DE | 102013219212 A1 | 3/2015 |
| DE | 102014218840 A1 | 4/2016 |
| DE | 102015012339 B3 | 10/2016 |
| WO | 0192088 A1 | 12/2001 |

* cited by examiner

*Primary Examiner* — Jason S Morrow
(74) *Attorney, Agent, or Firm* — Leydig, Voit & Mayer, Ltd.

(57) ABSTRACT

An air-guiding device for a motor vehicle includes an air-guiding profile having at least two air-guiding elements that are movable relative to one another in order to realize different air-guiding profile cross sections. The air-guiding elements are at least partially connected to one another in elastically flexible fashion and by way of connecting elements in a fin-ray-type configuration.

17 Claims, 2 Drawing Sheets

US 10,703,425 B2

AIR-GUIDING DEVICE

CROSS REFERENCE TO RELATED APPLICATION

This application claims benefit to German Patent Application No. DE 10 2017 124 442.5, filed Oct. 19, 2017, which is hereby incorporated by reference herein.

FIELD

The invention relates to an air-guiding device for a motor vehicle, having an air-guiding profile which comprises at least two air-guiding elements which are movable relative to one another. The invention also relates to a method for operating an air-guiding device of said type. The invention furthermore relates to a motor vehicle having such an air-guiding device.

BACKGROUND

The German laid-open specification DE 10 2013 101 689 A1 has disclosed an air-guiding device for a motor vehicle, having an air-guiding profile which comprises at least two air-guiding elements which are movable relative to one another in order to realize different air-guiding profile cross sections. The German laid-open specification DE 10 2013 219 212 A1 has disclosed an underbody paneling part of a wheel axle in the region of the wheel arch of a motor vehicle, having a main body, the covering area of which is variable and which has a fastening structure for the fixed connection to the body and/or a fastening structure for the fixed connection to a transverse link of the vehicle. The German laid-open specification DE 10 2014 218 840 A1 has disclosed a vent, in particular air vent, for a vehicle, having a flow channel which is formed by a casing wall and in which there is arranged at least one elastically deformable air-guiding element which extends at least substantially in a throughflow direction of the flow channel, wherein the casing wall of the flow channel is of elastically deformable form at least in a section assigned to the air-guiding element. The German laid-open specification DE 10 2013 216 610 A1 has disclosed a windshield wiper device for a vehicle, in particular a motor vehicle, which windshield wiper device has an elongate upper part which is at least partially of flexible form, wherein the windshield wiper device comprises an elongate lower part which is at least partially of flexible form, wherein multiple connecting elements are provided for connecting the upper part and the lower part, wherein the connecting elements are spaced apart from one another along a longitudinal extent of the windshield wiper device, and wherein the connecting elements are elastically deformable. The German laid-open specification DE 10 2013 214 064 A1 has disclosed a similar windshield wiper device, wherein multiple actuators for generating length contractions are provided, which actuators are arranged in the lower part along the longitudinal extent thereof. The German patent specification DE 10 2015 012 339 B3 has disclosed a motor vehicle component, having at least one diaphragm which has or is composed of an elastically deformable material and which can be transferred from a first state into at least one second state in which it is deformed in relation to the first state, wherein the diaphragm has a multiplicity of individual plates, the spacing of which and/or the position of which in a three-dimensional space can be changed by transferring the diaphragm from the first state into the second, deformed state. The international laid-open specification WO 01/92088 A1 has disclosed a motor vehicle outer skin which is at least regionally of movable design, wherein, for moving the outer skin, at least one actuator is provided which comprises a polymer material and/or ion-exchanging material and/or material which has different conformations, which material is movable by physical or chemical effects.

SUMMARY

In an embodiment, the present invention provides an air-guiding device for a motor vehicle. The air guiding device includes an air-guiding profile having at least two air-guiding elements that are movable relative to one another in order to realize different air-guiding profile cross sections. The air-guiding elements are at least partially connected to one another in elastically flexible fashion and by way of connecting elements in a fin-ray-type configuration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
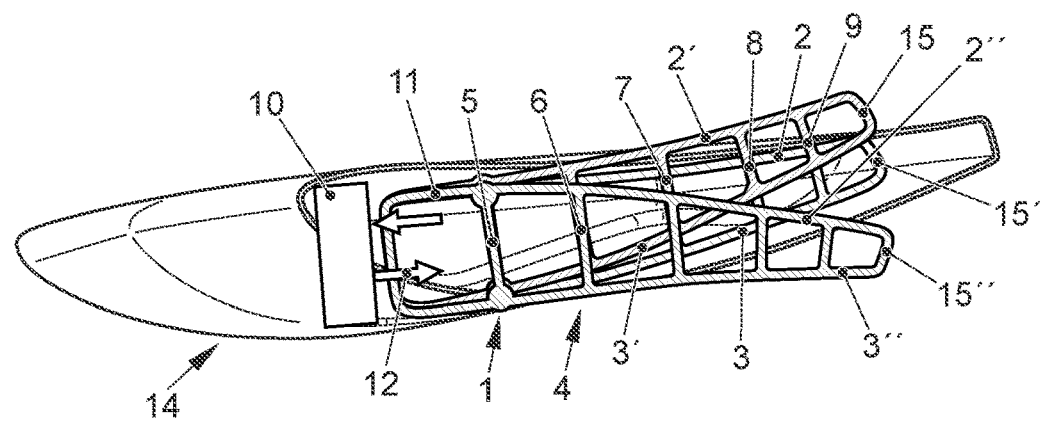
FIG. 1 is a perspective sectional illustration of a rear wing with an integrated air-guiding device.

Embodiments of the invention provide improved air-guiding devices for a motor vehicle, having an air-guiding profile which comprises at least two air-guiding elements which are movable relative to one another in order to realize different air-guiding profile cross sections, in particular with regard to the production thereof and/or operation on a motor vehicle.

Embodiments of the invention provide air-guiding devices for a motor vehicle, having an air-guiding profile which comprises at least two air-guiding elements which are movable relative to one another in order to realize different air-guiding profile cross sections, in that the air-guiding elements are at least partially connected to one another in elastically flexible fashion and by means of connecting elements in a fin-ray-type configuration. The air-guiding elements which are connected to one another in a fin-ray-type configuration by means of the connecting elements are arranged substantially in an acute-angled triangle. Here, the air-guiding elements are, viewed in cross section, curved to a greater or lesser extent such that they resemble two longitudinal rays or fin rays of a fin. The connecting elements constitute transverse struts in the acute-angled triangle, which are connected elastically to one another by means of the air-guiding elements. The air-guiding elements which are connected to one another in a fin-ray-type configuration advantageously permit, by means of the combination with the connecting elements, a continuous adjustment of the air-guiding profile, in particular between at least one lift position and at least one downforce position.

A preferred exemplary embodiment of an air-guiding device is characterized in that the connecting elements have different lengths which decrease toward an acute angle of the substantially acute-angled air-guiding profile at a common end of the air-guiding elements. The expression "substantially acute-angled" relates to the angle enclosed between the two-guiding elements at the common end thereof. The acute angle is preferably less than forty degrees, in particular less than twenty degrees. The common end of the air-guiding elements may taper to a point, though may also be truncated.

A further preferred exemplary embodiment of an air-guiding device is characterized in that the connecting elements are coupled to the air-guiding elements such that an air-guiding element facing toward an air flow curves in concave fashion toward the air flow, wherein the common end of the air-guiding elements turns upward. In this way, in a simple manner, an intelligent air-guiding device is created which automatically adjusts itself in a manner dependent on an air flow incident on the air-guiding profile.

A further preferred exemplary embodiment of an air-guiding device is characterized in that an actuator acts in the vicinity of an end of the air-guiding profile, which end is averted from the common end of the air-guiding elements. This provides the advantage that, with very short actuating movements of the actuator, relatively large geometrical or aerodynamic changes can be made to the air-guiding profile.

A further preferred exemplary embodiment of an air-guiding device is characterized in that the actuator acts on a connecting element which is remote from the common end of the air-guiding elements. The actuator advantageously acts on connecting points at which the connecting element remote from the common end of the air-guiding elements is connected to the two air-guiding elements. In this way, it is particularly advantageously possible for an adequate adjustment or geometrical or aerodynamic change to the air-guiding profile to be effected with relatively low actuating forces.

According to embodiments of the invention, methods for operating an air-guiding device, in particular in a motor vehicle, are provided in which the air-guiding profile is adjusted in continuous fashion between at least two positions, in particular at least one lift position and at least one downforce position. By means of the continuous adjustment, it is advantageously possible for desired lift or downforce, with respect to a motor vehicle equipped with the air-guiding device, to be generated in a highly effective manner.

A preferred exemplary embodiment of a method is characterized in that the actuator for adjusting the air-guiding profile acts on connecting points at which the connecting element remote from the common end of the air-guiding elements is connected to the two air-guiding elements. This provides the advantage that the air-guiding profile can be adjusted in continuous fashion in accordance with demand with very low adjusting forces.

A further preferred exemplary embodiment of a method is characterized in that, by means of the actuator, actuating forces whose lines of action run substantially as an elongation of the respectively associated air-guiding element are imparted at the connecting points. The actuating forces may for example be imparted fluidically, in particular pneumatically or hydraulically, or mechanically. The actuator may also comprise at least one piezo actuator. In a further exemplary embodiment, the actuator comprises a type of camshaft, which acts with different cams or cam sections on multiple air-guiding devices or partial air-guiding devices of a combined air-guiding device.

Embodiment of the invention provide motor vehicles having an air-guiding device as described above, which can be operated in particular in accordance with a method described above. The motor vehicle is preferably a passenger motor vehicle which is equipped, in a rear region, with the air-guiding device described above. The air-guiding device may be assembled from multiple air-guiding devices or secondary air-guiding devices. It is also possible for multiple air-guiding devices to be provided at different locations, in particular in the rear region, of the motor vehicle.

A preferred exemplary embodiment of a motor vehicle is characterized in that the air-guiding device is designed as a rear spoiler, as a rear wing, in particular as a split wing, and/or as a diffuser, in particular in a rear region of the motor vehicle, or is integrated into a rear spoiler, a rear wing, in particular a split wing, or into a diffuser, in particular in the rear region of the motor vehicle. In the case of a fastback motor vehicle, the air-guiding device is arranged for example below a rear window. In the case of a hatchback motor vehicle, the air-guiding device is arranged for example in the region of a rear roof edge above a rear window. In the case of a two-door or four-door passenger motor vehicle designed as a sports car, the air-guiding device is, in a further exemplary embodiment, designed as a rear wing or split wing which is combined with a lower shell of the motor vehicle. The air-guiding device may advantageously also constitute an optimized separation edge or Gurney flap.

FIGS. 1 to 5 illustrate various exemplary embodiments for the arrangement of an air-guiding device 1 on a motor vehicle in different views. The air-guiding device 1 comprises two flexible air-guiding elements 2, 3 which constitute a continuously adjustable air-guiding profile 4. The two air-guiding elements 2, 3 are connected to one another, in the manner of fin rays of a fin profile, by means of connecting elements 5, 6, 7, 8, 9.

The continuous adjustment of the air-guiding elements 2, 3 is initiated by means of an actuator 10. An arrow 11 is used to indicate that the air-guiding element 2 can, by means of the actuator 10, be varied into a lift position indicated by 2'. An arrow 12 is used indicate that the air-guiding element 3 can, by means of the actuator 10, be varied into a downforce position 3". The air-guiding element 3 assumes the position 3' in the lift position. The air-guiding element 2 assumes the position 2" in the downforce position.

As indicated by the arrows 11 and 12, the actuator 10 acts on connecting points at which the connecting element 5 is connected to the air-guiding element 2 and 3. The connecting element 5 is arranged remote from a common end 15 of the air-guiding elements 2, 3. At the common end 15, the air-guiding elements 2 and 3 enclose an acute angle. The common end 15 of the air-guiding elements 2, 3 is of truncated design.

In FIG. 1, the air-guiding device 1 is integrated into a rear wing 14 of a motor vehicle. By means of the actuator 10, it is possible, when a corresponding actuating force, indicated by the arrows 11 and 12, is applied, for either the top side of the air-guiding profile 4 to be varied by means of the air-guiding element 2', or for the bottom side of the air-guiding profile 4 to be varied by means of the air-guiding element 3", such that air flowing along said top side or bottom side is aerodynamically influenced.

Accordingly, in the case of the rear wing 14, a virtually continuous variation between lift generation and downforce generation is possible without a deployment movement of the rear wing 14. The movement travels required for the illustrated change in geometry of the air-guiding profile 4, and the corresponding actuating forces, which are indicated by the arrows 11 and 12, are very small in relation to conventional movement units, despite the fact that the common end 15, 15', 15" of the air-guiding elements 2, 2', 2"; 3, 3', 3" is subjected to relatively large changes in geometry.

Figure 2:
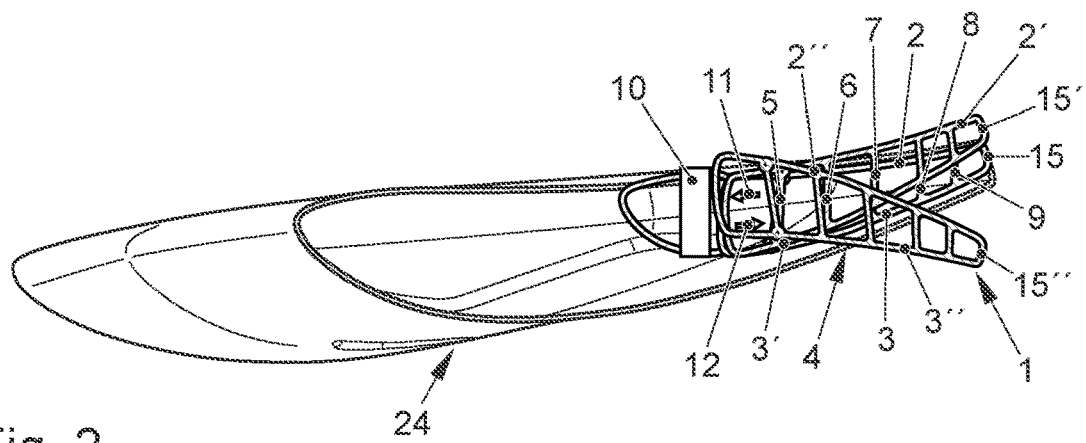
FIG. 2 shows a similar exemplary embodiment as in FIG. 1, wherein the air-guiding device is arranged only in a rear end region of the rear wing.

In the exemplary embodiment illustrated in FIG. 2, the air-guiding device 1 is arranged in a rear region of a rear wing 24. The air-guiding device 1 otherwise functions exactly as in the exemplary embodiment illustrated in FIG. 1. In FIG. 2, the air-guiding device 1 can advantageously be used for the variable change in geometry of an aerodynamically particularly effective trailing edge in the case of a deployed rear spoiler or rear wing 24.

Figure 3:
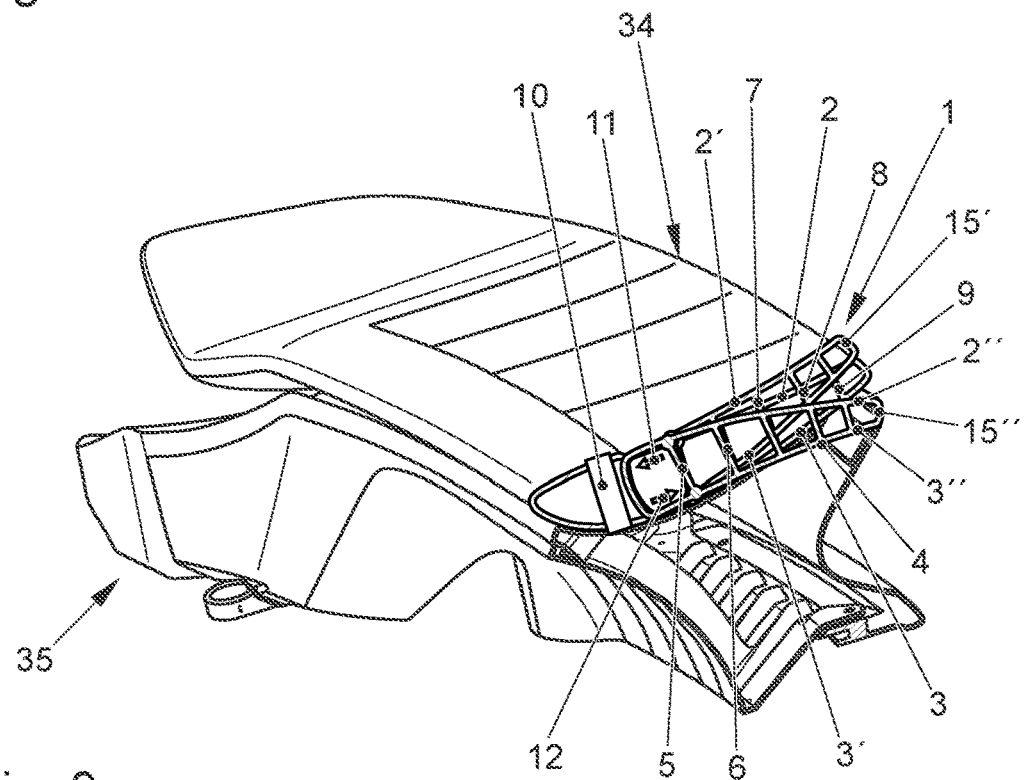
FIG. 3 shows a rear wing which is designed as a split wing and which has a lower shell of a motor vehicle in a perspective sectional illustration.

FIG. 3 illustrates, in a sectional perspective view, a rear wing 34 in combination with a lower shell 35 of a motor vehicle 40. The air-guiding device 1 is, for the variable change in geometry of the aerodynamically particularly effective trailing edge of the vehicle rear end, integrated into the rear wing 34. The surface of the rear wing 34 may be varied in one piece or in individual segments by means of the air-guiding device 1. As in the preceding exemplary embodiments, the actuator 10 is integrated into the rear wing 34.

Figure 4:
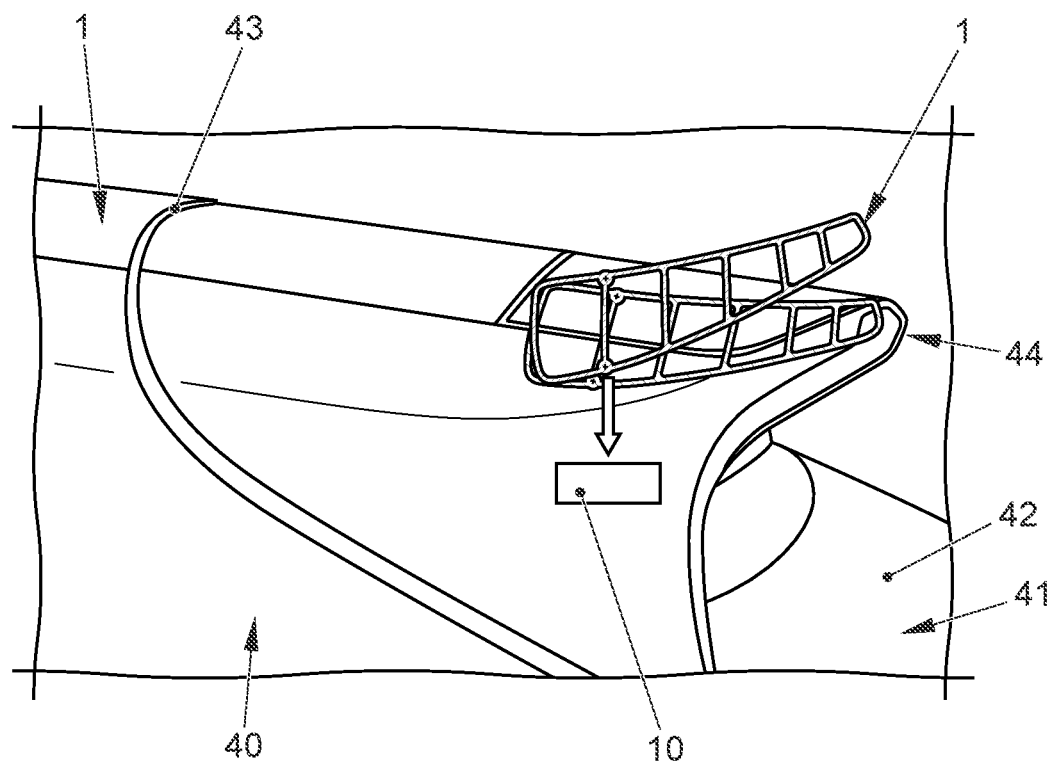
FIG. 4 shows a further exemplary embodiment of the air-guiding device on a tailgate above a rear window.

FIG. 4 illustrates a rear upper end of a motor vehicle 40 with a tailgate 41 and a rear window 42. A top side of the tailgate 41 extends as an elongation of a gap 43 to a roof trailing edge 44. The air-guiding device 1 is integrated into the top side of the tailgate 41 at the roof trailing edge 44. Here, too, the surface on the top side of the vehicle rear end may be varied in one piece or in individual segments.

Figure 5:
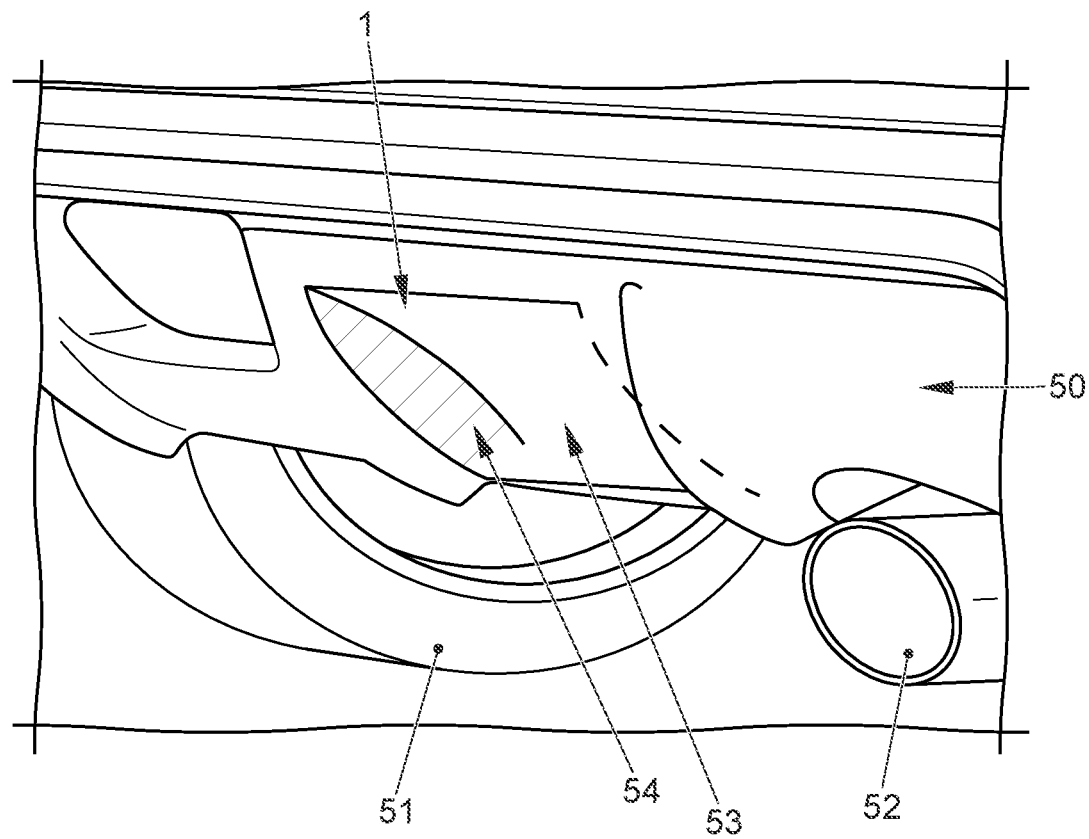
FIG. 5 shows a rear lower end of a motor vehicle having an air-guiding device designed as a diffuser.

FIG. 5 is a perspective illustration of a lower end region of a motor vehicle 50 with a left-hand rear wheel 51 and a right-hand exhaust tailpipe 52. A diffuser 53 is equipped, in a central region 54, with the air-guiding device 1. In this way, during operation, an air flow at the underside of the motor vehicle 50 can be influenced in a highly effective manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An air-guiding device for a motor vehicle, the air guiding device comprising:
   an air-guiding profile having at least two air-guiding elements that are movable relative to one another in order to realize different air-guiding profile cross sections,
   wherein the air-guiding elements are at least partially connected to one another in elastically flexible fashion and by way of connecting elements in a fin-ray-type configuration comprising a plurality of fin-rays,
   wherein an actuator is configured to act on connecting points at which a first connecting element is connected to the two air-guiding elements, and
   wherein the first connecting element is one of the connection elements that is spaced apart from a common end of the air-guiding elements.

2. The air-guiding device as claimed in claim 1, wherein the connecting elements have different lengths which decrease toward an acute angle of the air-guiding profile at the common end of the air-guiding elements.

3. The air-guiding device as claimed in claim 2, wherein the connecting elements are coupled to the air-guiding elements such that an air-guiding element facing toward an air flow curves in concave fashion toward the air flow, wherein the common end of the air-guiding elements turns upward.

4. The air-guiding device as claimed in claim 2, wherein the actuator acts in a vicinity of an end of the air-guiding profile, the end being averted from the common end of the air-guiding elements.

5. A method for operating an air-guiding device as claimed in claim 1, wherein the air-guiding profile is adjusted in continuous fashion between at least one lift position and at least one downforce position.

6. A method for operating an air-guiding device as claimed in claim 1, wherein the actuator, for adjusting the air-guiding profile, acts on the connecting points.

7. The method as claimed in claim 6, wherein, by way of the actuator, actuating forces whose lines of action run substantially as an elongation of the respectively associated air-guiding element are imparted at the connecting points.

8. A motor vehicle having an air-guiding device, configured to be operated by a method as claimed in claim 5.

9. The motor vehicle as claimed in claim 8, wherein the air-guiding device is configured as a rear spoiler, as a rear wing, as a split wing, and/or as a diffuser, or is integrated into a rear spoiler, a rear wing, or a diffuser.

10. The air-guiding device as claimed in claim 2, wherein the connecting elements are transverse struts in the acute angle of the air-guiding profile that are connected elastically to one another by the air-guiding elements.

11. The air guiding device as claimed in claim 2, wherein the acute angle is less than forty degrees.

12. The air guiding device as claimed in claim 1, wherein the common end of the air guiding element has a truncated shape.

13. The air guiding device as claimed in claim 1,
    wherein a first one of the connecting points connects the first connecting element to a first one of the air-guiding elements, and wherein a second one of the connecting points connects the first connecting element to a second one of the air-guiding elements.

14. The air guiding device as claimed in claim 1, wherein the actuator is configured to apply an action force causing an elongation of at least one the first one of the air-guiding elements or the second air-guiding elements.

15. The air guiding device as claimed in claim 1, wherein the actuator is configured to impart the actuating force fluidically.

16. The air guiding device as claimed in claim 1, wherein the actuator comprises at least one piezo actuator.

17. The air guiding device as claimed in claim 1, where in the first connecting element is between the common end and an end averted from the common end.

* * * * *